US005704026A

United States Patent [19]

Wan

[11] Patent Number: 5,704,026
[45] Date of Patent: Dec. 30, 1997

[54] METHOD AND APPARATUS FOR DETERMINING A GAMUT BOUNDARY AND A GAMUT DESCRIPTOR

[75] Inventor: Shijie J. Wan, Rochester, N.Y.

[73] Assignee: Eastman Kodak Company, Rochester, N.Y.

[21] Appl. No.: 782,852

[22] Filed: Jan. 13, 1997

Related U.S. Application Data

[63] Continuation of Ser. No. 68,887, May 28, 1993, abandoned.

[51] Int. Cl.$^6$ .................................................. G06T 15/50
[52] U.S. Cl. .......................................... 395/131; 395/119
[58] Field of Search .................................. 395/131, 119; 358/500–1, 518–20

[56] References Cited

U.S. PATENT DOCUMENTS

| | | | |
|---|---|---|---|
| H1506 | 12/1995 | Beratta | 345/199 |
| 4,275,413 | 6/1981 | Sakamoto et al. | 358/525 |
| 4,386,411 | 5/1983 | Risk et al. | 395/130 |
| 4,462,083 | 7/1984 | Schwefel | 364/577 |
| 4,500,919 | 2/1985 | Schreiber | 358/518 |
| 4,534,059 | 8/1985 | Yamada | 382/54 |
| 4,763,283 | 8/1988 | Coutrot | 364/526 |
| 4,813,000 | 3/1989 | Wyman et al. | 364/526 |
| 4,818,979 | 4/1989 | Manson | 345/115 |
| 4,875,032 | 10/1989 | McManus et al. | 345/154 |
| 4,901,258 | 2/1990 | Akiyama | 364/577 |
| 4,941,038 | 7/1990 | Walowit | 358/518 |
| 5,003,299 | 3/1991 | Batson et al. | 345/199 |
| 5,018,085 | 5/1991 | Smith, Jr. | 364/526 |
| 5,025,400 | 6/1991 | Cook et al. | 395/125 |
| 5,038,300 | 8/1991 | Seiler et al. | 395/131 |
| 5,065,234 | 11/1991 | Hung et al. | 358/523 |
| 5,087,126 | 2/1992 | Pochieh | 356/402 |
| 5,157,506 | 10/1992 | Hannah | 358/298 |
| 5,185,661 | 2/1993 | Ng | 358/505 |
| 5,231,504 | 7/1993 | Magee | 358/500 |
| 5,268,754 | 12/1993 | Van de Capelle et al. | 358/527 |
| 5,299,291 | 3/1994 | Ruetz | 395/109 |
| 5,333,069 | 7/1994 | Spence | 358/517 |
| 5,333,243 | 7/1994 | Best et al. | 395/109 |
| 5,343,311 | 8/1994 | Morag et al. | 358/518 |

(List continued on next page.)

FOREIGN PATENT DOCUMENTS

| | | |
|---|---|---|
| 0403081 | 12/1990 | European Pat. Off. . |
| 1439534 | 11/1988 | U.S.S.R. . |
| 2 155 738 | 9/1985 | United Kingdom . |

OTHER PUBLICATIONS

Sabella, Paolo; A Rendering Algorithm for Visualizing 3D Scalar Fields; Aug. 1988; pp. 51–58.

(List continued on next page.)

*Primary Examiner*—Joseph H. Feild
*Assistant Examiner*—Rudolph Buchel
*Attorney, Agent, or Firm*—Thomas H. Close

[57] ABSTRACT

A device gamut boundary surface in a device independent color space (DICS) is defined by a set of small triangles. Each triangle in the DICS corresponds to a triangle on the surface of a color cube in a device dependent color space (DDCS). The triangles in the DICS are derived based on a look-up table which can be obtained by measuring a set of color patches produced from the given device. A small set of carefully selected gamut boundary points or signals in the DICS are determined and their corresponding signals or points on the surface of the color cube in the DDCS are computed. These data are stored in a table called a gamut descriptor. Gamut descriptor signals or points can be determined by a convex polyhedral cone inclusion process and their corresponding signals in the DDCS can be determined by triangle interpolation. The gamut descriptor usually includes gamut boundary signals at a number of lightness layers along a series of predetermined hue angles. The gamut descriptor is a compact representation of the gamut boundary. The signal distribution pattern in a gamut descriptor provides useful information for determining in-gamut and out-of-gamut signals and for fast mapping between color spaces in cross-media color calibration.

7 Claims, 9 Drawing Sheets

U.S. PATENT DOCUMENTS

| | | | |
|---|---|---|---|
| 5,384,901 | 1/1995 | Glassner et al. | 395/131 |
| 5,416,890 | 5/1995 | Beratta | 395/131 |
| 5,481,655 | 1/1996 | Jacobs | 395/109 |
| 5,500,921 | 3/1996 | Ruetz | 395/109 |
| 5,510,910 | 4/1996 | Bockman et al. | 358/502 |
| 5,537,228 | 7/1996 | Dillinger | 358/502 |
| 5,583,666 | 12/1996 | Ellson et al. | 358/518 |

OTHER PUBLICATIONS

Foley et al.; Computer Graphics: Principles and Practice; 1990, pp. 578–603, 701–705.

Gass, Saul; *An Insulated Guide to Linear Programming*; 1970; pp. 128–143.

Lawrence F. Shampine and Richard C. Allen, Jr., "Numerical Computing: an introduction", 1973, pp. 147–156 and 252–255.

Michael Kallay, "Convex Hull Made Easy", 1986, p. 161, *Information Processing Letters 22*.

Katsuhiro Kanamori and Hiroaki Kotera, "Color Correction Technique for Hard Copies by 4–Neighbors Interpolation Method", *Journal of Imaging Science and Technology*, vol. 36, No. 1, Jan./Feb. 1992, pp. 73–80.

Robert E. Barnhill and Wolfgang Boehm, "Surfaces In Computer Aided Geometric Design", 1992, pp. 100–107.

Katsuhiro Kanamori et al., "A Color Transformation Algorithm Using 'Prism' Interpolation", *IS&T's Eighth International Congress on Advances in Non–Impact Printing Technologies*, 1992, pp. 477–482.

Alan W. Paeth, "Algorithms For Fast Color Correction", *Proceedings of the SID*, vol. 30/3, 1989, p. 175.

R.S. Gentile et al., "A Comparison of Techniques for Color Gamut Mismatch Compensation", *Journal of Imaging Technology*, vol. 16, No. 5, Oct. 1990, pp. 176–181.

Maureen C. Stone et al., "Color Gamut Mapping and the Printing of Digital Color Images", *ACM Transactions on Graphics*, vol. 7, No. 4, Oct. 1988, pp. 249–292.

Steven R. Lay, "Convex Sets and Their Applications", pp. 16–21.

Peter Alfeld, "Scattered Data Interpolation in Three or More Variables", 1989, pp. 1–33.

Donald Shepard, "A two–dimensional interpolation function for irregularly–spaced data", pp. 517–524, 1968.

Abstract—U.S. Patent 4,992,861, Feb. 12, 1991.

Abstract—U.S. Patent 4,975,866, Dec. 4, 1990.

Abstract—U.S. Patent 4,839,722, Jun. 13, 1989.

Abstract—U.S. Patent 4,833,531, May 23, 1989.

Abstract—U.S. Patent 4,609,917, Aug. 2, 1986.

Abstract—"New Direct Color Mapping Method For Reducing The Storage Capacity of Look–Up Table Memory", H. Ikegami, *Proceedings of the SPIE—The International Society for Optical Engineering*, Vo. 1075, pp. 26–31, 1989.

Abstract—"A Fast Algorithm For Color Image Quantization Using Only 256 Colors", T. Watanabe, *Systems and Computers in Japan*, vol. 19, No. 3, pp. 64–72, Mar. 1988.

Abstract—"A Color Compression Algorithm Using Linear Division of RGB Space", Y. Arai et al., *Transactions of the Institute of Electronics, Information and Communication Engineers*, vol. J70, No. 2, pp. 346–351, Feb. 1987.

Abstract—U.S. Patent 5,053,866, Oct. 1, 1991.

Abstract—U.S. Patent 5,107,332, Apr. 21, 1992.

Abstract—U.S. Patent 4,977,521, Dec. 11, 1990.

Abstract—U.S. Patent 4,991,120, Feb. 5, 1991.

Abstract—U.S. Patent 5,134,573, Jul. 28, 1992.

Abstract—U.S. Patent 4,660,156, Apr. 21, 1987.

Abstract—Japan 1–277886, Nov. 8, 1989.

Abstract—Japan 2–79093, Mar. 19, 1990.

Abstract—Japan 2–146589, Jun. 5, 1990.

Abstract—Japan 31–94593, Aug. 26, 1991.

Abstract—Soviet Union 1538–166–A, Dec. 4, 1988.

METHOD AND APPARATUS FOR DETERMINING A GAMUT BOUNDARY AND A GAMUT DESCRIPTOR

This is a continuation of application Ser. No. 08/068,887, filed May 28, 1993 now abandoned.

CROSS REFERENCES TO RELATED APPLICATIONS

This application is related to concurrently filed applications entitled Method And Apparatus For Mapping Between Color Spaces And Creating A Three Dimensional Inverse Look-up Table by Wan, Miller and Sullivan U.S. Ser. No. 08/068,941, filed May 28, 1993, having Kodak Docket No. 66,915 and entitled Method and Apparatus For Convex Interpolation For Color Calibration by Wan, Miller and Sullivan U.S. Ser. No. 08/068,823, having Kodak Docket No. 66,875, both incorporated by reference herein.

BACKGROUND OF THE INVENTION

1. Field of the Invention

The present application is directed to a method and apparatus for creating a gamut descriptor used for converting color data from one color space to another color space and, more particularly, to a system which allows fast color calibration using a carefully selected set of gamut boundary points in a device independent color space.

2. Description of the Related Art

A color device such as CRT or printer is driven by 3 or 4 color signals to produce or display colors. Color signals for CRTs are R (red), G (green), B (blue), while color signals for printers are C (cyan), M (magenta), Y (yellow) and an additional signal K (black) may be used for some printers. A color space which uses R,G,B or CMY signals is called a device dependent color space (DDCS). The R,G,B or C,M,Y signals are usually integers from 0 to 255. For a printer, the signal range of C,M,Y is bounded by a device color range cube or color cube 10 as depicted in FIG. 1. In total, there are typically 256×256×256 (about 16.6 million) different combinations of code values or signals in the cube 10, and therefore the printer can produce 256×256×256 different colors. Each color produced by the printer can be measured by conventional physical instruments measuring a printer produced color patch to determine its location (a point) or color signal in standard CIEXYZ color space, a device independent color space (DICS), which can then be conventionally converted into a point (or color signal) in standard CIEL*a*b* space or CIELUV space, which are device independent color spaces (DICSs). The range (volume) occupied by the 256×256×256 points of the color cube 10, when converted into signals in the CIEL*a*b* space, is called the gamut 12 of the device. By definition, a device gamut means or defines all the colors (in CIEL*a*b*) that the device can produce. Colors located on the gamut 12 boundary in CIEL*a*b*, the device independent color space, are produced by the signal values on the surface of the color cube 10 in CMY, the device dependent color space.

Using the above method, one can determine the gamut of a given printer precisely. However, this method would require measuring about 16.6 million color patches, which is almost impossible in practice. A more practical method is to measure a small number of color patches (say, 512) and convert them into points or signals in the device independent space (CIEL*a*b*). For convenience, the signal values for these color patches are usually chosen to be lattice points, covering the full range of the cube 10. FIG. 2 illustratively depicts the distribution of the color cube lattice points for the color patches in CMY and CIEL*a*b* spaces. Storing these points in a table, one obtains a so called look-up table (LUT) from CMY to CIEL*a*b*. Based on the LUT, interpolation methods can then be used to map arbitrarily designated points between the two spaces.

As can be seen the lattice points in the cube 10 of FIG. 2 are regularly distributed while the corresponding points in the gamut 12 are irregularly distributed. Using the LUT the mapping of arbitrarily positioned color signals from CMY to CIEL*a*b* is quick and easy because the points in the LUT between which interpolation is performed are lattice points. However, the reverse conversion from CIEL*a*b* to CMY is much more difficult because the entry points in the CIEL*a*b* space used for the interpolation are not lattice points. To perform the reverse conversion efficiently an inverse look-up table is needed which includes CIEL*a*b* lattice points as entry points. To efficiently create this inverse look-up the gamut boundary needs to be determined and a compact version of the gamut boundary will allow points in the CIEL*a*b* space outside the gamut 12 to be efficiently converted into points inside the gamut 12.

SUMMARY OF THE INVENTION

It is an object of the present invention to provide a method to determine a gamut boundary point along a given direction.

It is another object of the present invention to create and use a gamut descriptor or compact representation of the gamut boundary to describe the gamut boundary of a device.

It is also an object of the present invention to provide a method of creating a gamut descriptor using a CMY to CIEL*a*b* look-up table.

It is another object of the present invention to provide a method to determine whether a given vector is enclosed by a convex polyhedral cone (CPC) in a d-dimensional vector space $R^d$.

It is a further object of the present invention to provide a method to determine the intersection of a line in a plane defined by three points where the line is enclosed by a convex polyhedral cone formed of three points.

It is a further object of the present invention to provide a one to one invertible interpolation method between two triangles in two three dimensional spaces.

It is also an object of the present invention to provide a method to define and construct a gamut boundary using a set of triangles (planes) based on a given look-up table.

It is also an object of the present invention to provide a method to determine whether or not a given point or signal is within a gamut.

The above objects can be attained by using a gamut descriptor. A gamut descriptor is a set of carefully selected gamut boundary points or signals in a device independent color space. The signals in the gamut descriptor can be determined once the definition of the gamut boundary is given. The present invention defines the gamut boundary using a set of triangles obtainable from a given look-up table. The gamut descriptor signals are all located on the triangles forming the boundary. These signals can be determined by using a convex polyhedral cone inclusion process. The corresponding point or signal in the device dependent color space is then determined by triangle interpolation. A list of the point pairs for each layer is or defines the gamut descriptor which is a representation of the gamut boundary on this layer. This gamut descriptor is used to create an inverse look-up table for transforming color signals from the device independent space to the device dependent space.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention provides a fast method to create a device gamut descriptor. The gamut descriptor is used to produce an inverse look-up table (ILUT) which helps in mapping points or signals in a device independent color space (DICS) to points in a device dependent color space (DDCS). The device gamut descriptor can also be used to speed up the mapping from the DICS to the DDCS when an ILUT is not available. The gamut descriptor is a small set of carefully selected device gamut boundary points or signals in the DICS. These points are uniformly distributed on the gamut boundary, and cover the full range of the gamut. The descriptor points are preferably located on a set of equally spaced planes perpendicular to the axis L*, if the device independent space chosen is CIEL*a*b* or CIELUV, and angularly equidistant around each plane. This distribution pattern of gamut boundary points in the gamut descriptor is useful information for fast mapping from the DICS to the DDCS.

Depending on the application, the size of a gamut descriptor can be chosen to be from several hundred to several thousand points. Compared with the size of an image, and the size of an ILUT, a gamut descriptor is a small set of points. Computing a gamut descriptor is not time consuming as will be discussed in more detail herein.

Figure 3:
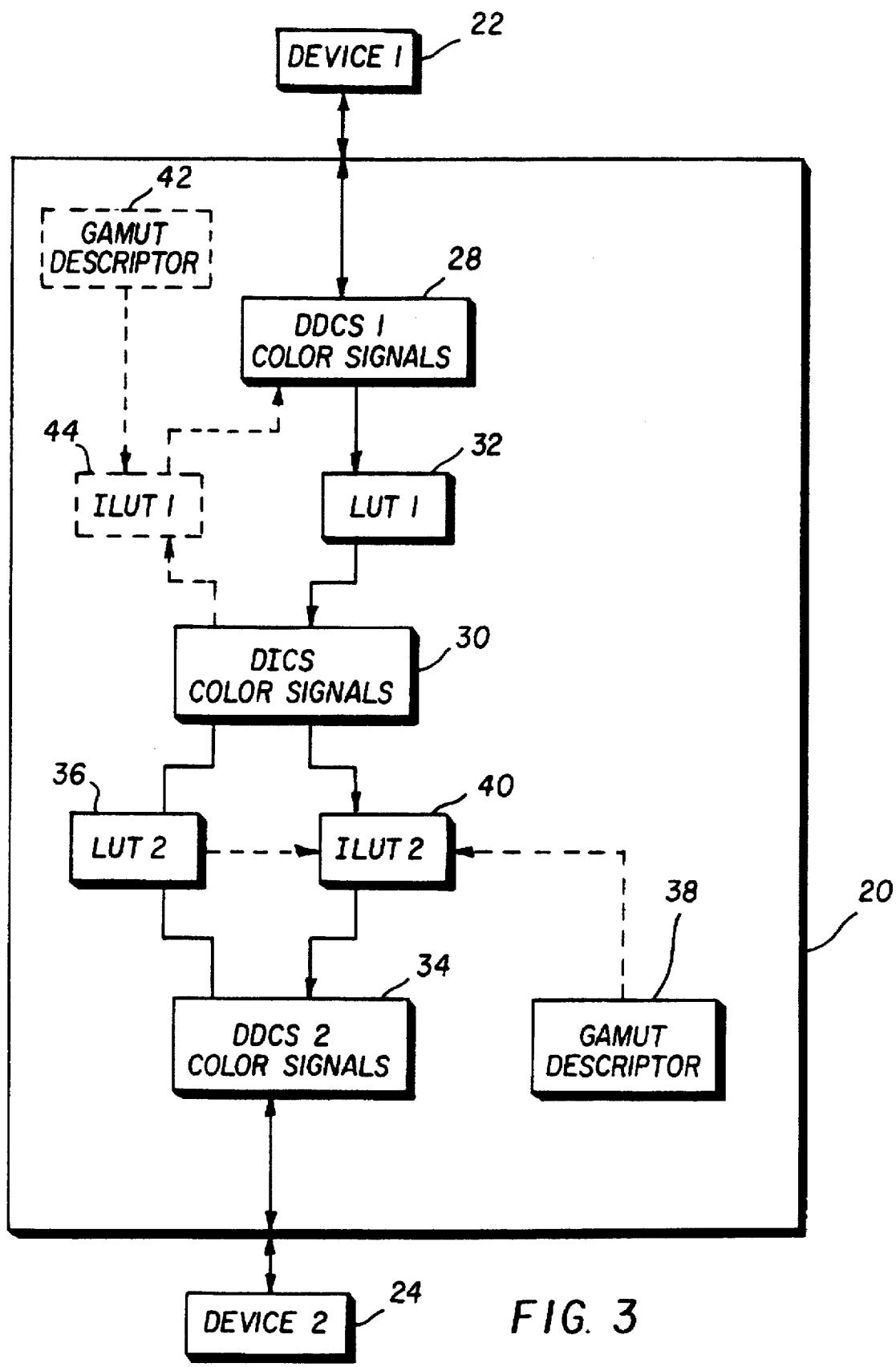
FIG. 3 depicts the hardware components of the present invention.

As illustrated in FIG. 3, the present invention includes a computer, such as a Sun Workstation or Apple Macintosh, and two output devices 22 and 24 which can be printers or CRTs from different manufacturers. Stored in the computer is an image 28, that is, the color signals which are used to create the image, for printing or display on the first device 22. The color signals for this image are color signals in a first device dependent color space. The present invention is designed to help convert such an image into device dependent color space signals for the second device 24. In this conversion process, color signals 28 in the device dependent color space color are converted into device independent color space color signals 30 using a conventional forward interpolation and the look-up table 32 for the first device 22. The color signals 30 for the device independent color space can be converted into device dependent color signals 34 for the second device 24 with the look-up table 36, which is normally used to convert color signals 34 for device 2 into the independent color signals 30, by using backward interpolation. However, it is much faster if the mapping method uses an inverse look-up table 40 and forward interpolation. The inverse look-up table 40 is created using the look-up table 36 and a gamut descriptor 38 for the second device 24. A detailed description of how to efficiently create the ILUT 40 is provided in the related application previously mentioned and entitled Method And Apparatus For Mapping Between Color Spaces And Creating A Three Dimensional Inverse Look-Up Table and a description of how to effectively convert color signals from the device independent space to the device dependent space is provided in the related application previously mentioned and entitled Method And Apparatus For Convex Interpolation For Color Calibration. The present invention of course can also use a gamut descriptor 42 to convert images stored for the second device 24 to images for the printing device 22.

Before describing the steps in creating the gamut descriptor several algorithms will be discussed which are used in the subsequent discussion.

Let $Y=\{y_1, y_2, \ldots, y_n\}$ be a set of points in a d-dimensional Euclidean space $R^d$. The convex polyhedral cone of Y, denoted by CPC(Y), is a set in $R^d$ defined by:

$$CPC(Y) = \left\{ y | y = \sum_{i=1}^{n} \alpha_i y_i, \alpha_1, \ldots, \alpha_n \geq 0 \right\}. \quad (1)$$

The convex hull of Y, denoted by CH(Y), is a set in $R^d$ defined by:

$$CH(Y) = \left\{ y | y = \sum_{i=1}^{n} \alpha_i y_i, \alpha_1, \ldots, \alpha_n \geq 0, \sum_{i=1}^{n} \alpha_i = 1 \right\}. \quad (2)$$

A vector y is enclosed by the cone CPC(Y) if there exist n coefficients $\alpha_1, \alpha_2, \ldots, \alpha_n$ such that $$y = \sum_{i=1}^{n} \alpha_i y_i, \alpha_1, \ldots, \alpha_n \geq 0. \quad (3)$$

Figure 4:
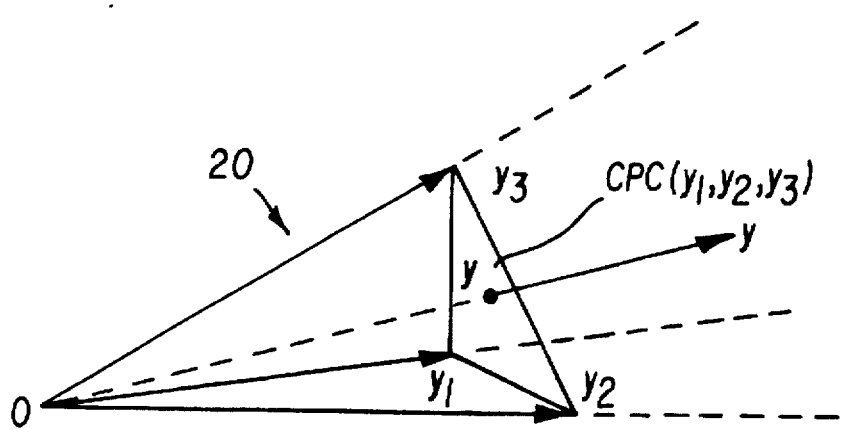
FIG. 4 illustrates a convex polyhedral cone formed by three vectors $y_1$, $y_2$, $y_3$.

FIG. 4 depicts a portion of a convex polyhedral cone 20 defined by three points $y_1$, $y_2$ and $y_3$ which encloses the vector y. The other portion is of an infinite range obtainable by extending the three vectors associated with the points $y_1$, $y_2$ and $y_3$ to infinity. CPC ($y_1$, $y_2$, $y_3$) also encloses vector y'.

Whether or not a given vector y is enclosed by the convex polyhedral cone defined by $Y = \{y_1, y_2, \ldots, y_n\}$ in $R^d$ can be determined by procedure 1:

Procedure 1:

Determine if $y \in CPC(Y)$.

1) Add $y_{n+1}=(1, 0, \ldots, 0)^T, \ldots, y_{n+d}=(0,0, \ldots, 1)^T$ to $y_1$, $y_2, \ldots, y_n$, where T denotes the transpose of a vector and where $y_{n+1}, \ldots, y_{n+d}$ are unit vectors.

2) Solve the following linear programming problem:

$$\text{Minimize} \sum_{i=n+1}^{n+d} \alpha_i$$

$$\text{subject to} \sum_{i=1}^{n+d} \alpha_i y_i = y, \alpha_1, \ldots, \alpha_{n+d} \geq 0.$$

3) If Minimizing $\sum_{i=n+1}^{n+d} \alpha_i > 0$, then we conclude $y \notin CPC(Y)$ (y is not enclosed by the cone); otherwise, $y \in CPC(Y)$, and in this case, procedure 1 returns n coefficients $\alpha_1, \ldots, \alpha_n$ satisfying equation (3).

Procedure 1 is a general method to solve the convex polyhedral cone inclusion problem. What the present invention is concerned with is a special case where d=n=3 and the cone is defined by a triangle. As we shall see shortly, in this case there is a need to find the intersection of a line defined by a vector y and the plane defined by 3 points $y_1$, $y_2$, $y_3$. Referring to FIG. 4, if y is enclosed by $CPC(y_1, y_2, y_3)$, then procedure 1 will return 3 coefficients $\alpha_1$, $\alpha_2$, $\alpha_3$ satisfying:

$$y = \sum_{i=1}^{3} \alpha_i y_i, \alpha_1, \alpha_2, \alpha_3 \geq 0. \tag{4}$$

Normalizing the coefficients in equation (4) by $\alpha = \alpha_1 + \alpha_2 + \alpha_3$, we obtain:

$$y' = \sum_{i=1}^{3} \alpha'_i y_i, y' = y/\alpha, \alpha'_i = \alpha_i/\alpha, \alpha'_i \geq 0, \alpha'_1 + \alpha'_2 + \alpha'_3 = 1 \tag{5}$$

Equation (5) indicates that the point y is enclosed by the convex hull of the three points $y_1$, $y_2$ and $y_3$. Since the convex hull of $y_1$, $y_2$, $y_3$ is a triangle, y' is in the plane defined by $y_1$, $y_2$, $y_3$. The intersection computation is described by procedure 2 set forth below.

Procedure 2:

Determine the intersection of a line defined by y and the plane defined by $y_1$, $y_2$, $y_3$, where $y \in CPC(Y_1, Y_2, Y_3)$.

1) Apply procedure 1 to find 3 coefficients $\alpha_1$, $\alpha_2$, $\alpha_3$ satisfying equation (4);
2) Compute the intersection point y' by equation (5).

Figure 5:
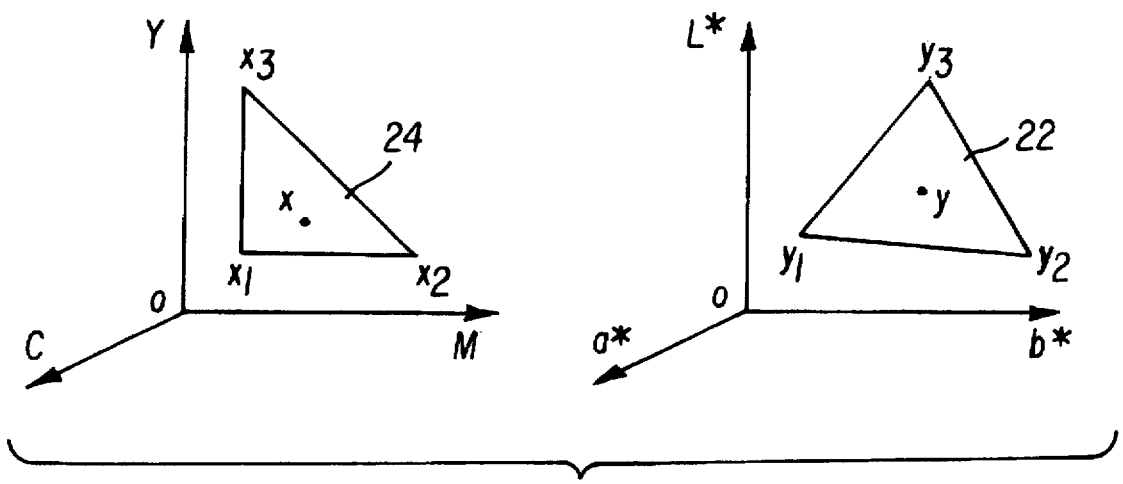
FIG. 5 shows corresponding device dependent and independent space triangles.

In the related application previously mentioned a convex interpolation method for color calibration is described. A special case of convex interpolation with 3 points in $R^3$ will now be discussed. In this case, the convex interpolation is called "triangle" interpolation. As illustrated in FIG. 5 let $y_1$, $y_2$, $y_3$ be three points of a triangle 22 in the CIEL*a*b* device independent space, and $x_1$, $x_2$, $x_3$ be the corresponding points of a triangle 24 in the CMY device dependent space. Let y be a given point in CIEL*a*b* which is inside the convex hull of $y_1$, $y_2$, $y_3$ (a triangle), i.e., $y \in CH(y_1, y_2, y_3)$. The system needs to compute corresponding point x in CMY by interpolation. Applying the convex hull inclusion procedure described in detail in the related application, three coefficients $\alpha_1$, $\alpha_2$, $\alpha_3$ are obtained satisfying:

$$y = \sum_{i=1}^{3} \alpha_i y_i, \sum_{i=1}^{3} \alpha_i = 1, \alpha_i \geq 0. \tag{6}$$

The system then interpolates by the triangle interpolation formula:

$$x = \sum_{i=1}^{3} \alpha_i x_i \tag{7}$$

Details of triangle interpolation from CIEL*a*b* to CMY is given below in procedure 3.

Procedure 3:

Interpolate a given point $y \in CH(y_1, y_2, y_3)$ by triangle interpolation.

1) Add unit vectors $y_4=(1,0,0)^T$, $y_5=(0,1,0)^T$, $y_6=(0,0,1)^T$ to $y_1$, $y_2$, $y_3$.
2) Solve the following conventional linear programming problem:

$$\text{Minimize} \sum_{i=4}^{6} \alpha_i$$

$$\text{subject to} \sum_{i=1}^{6} \alpha_i y_i = y, \sum_{i=1}^{6} \alpha_i = 1, \alpha_1, \ldots, \alpha_6 \geq 0$$

3) Since $y \in CH(y_1, y_2, y_3)$, the procedure will return three coefficients $\alpha_1$, $\alpha_2$, $\alpha_3$ satisfying equation (6);
4) Compute x by equation (7).

Triangle interpolation is a 1-1 mapping from a triangle $CH(y_1, y_2, y_3)$ to a triangle $CH(x_1, x_2, x_3)$. It is invertible. That is, if x is the result obtained by triangle interpolation for y, then, applying the same procedure to interpolate x, we will obtain y.

Figure 1:
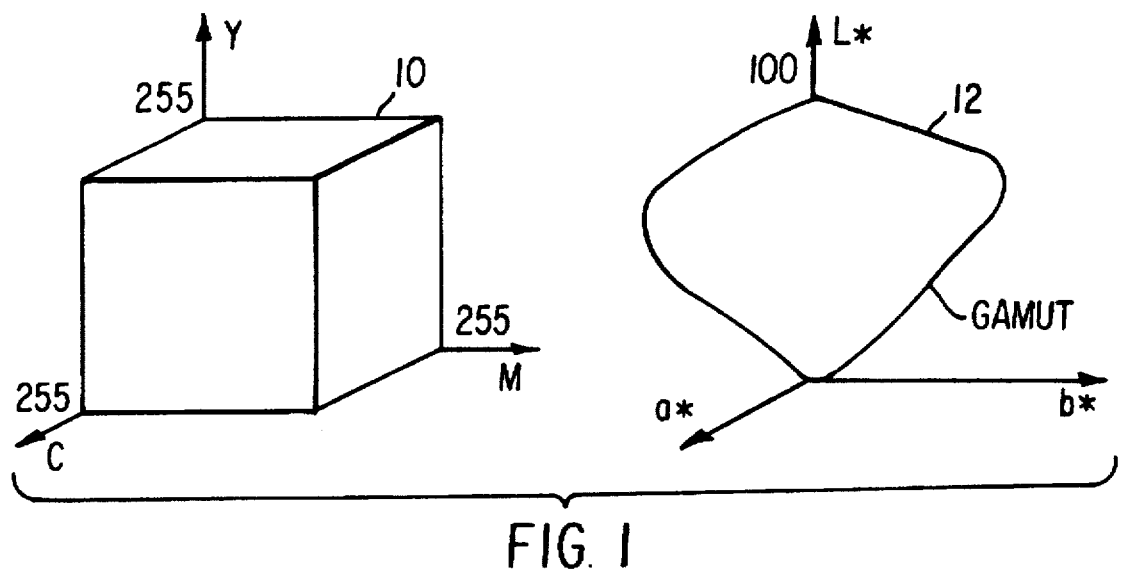
FIG. 1 illustrates a device dependent color cube 10 and a corresponding device independent gamut 12.
Figure 2:
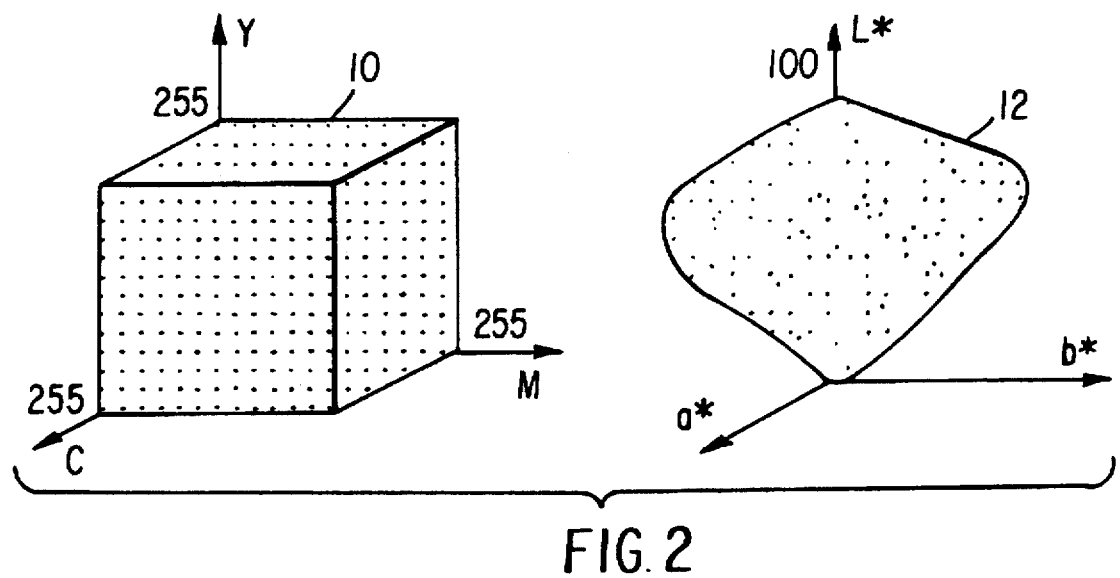
FIG. 2 depicts lattice points of the cube 10 and the irregularly distributed corresponding points in the device independent space forming the gamut.

With the above preparation, the gamut boundary can now be discussed. Referring to FIG. 2, the information available for the device gamut is the LUT which contains $N^3$ entries (N is usually in the range between 8 and 11). Among them, there are $6N^2-12N+8$ entries on the surface of the cube 10 in CMY, and the same number of points on the gamut 12 boundary in CIEL*a*b*. The system needs to estimate the gamut boundary based on the $6N^2-12N+8$ points to create the gamut descriptor. First a discussion will be provided on how to define a gamut boundary, and then on how to compute the gamut descriptor.

Figure 6:
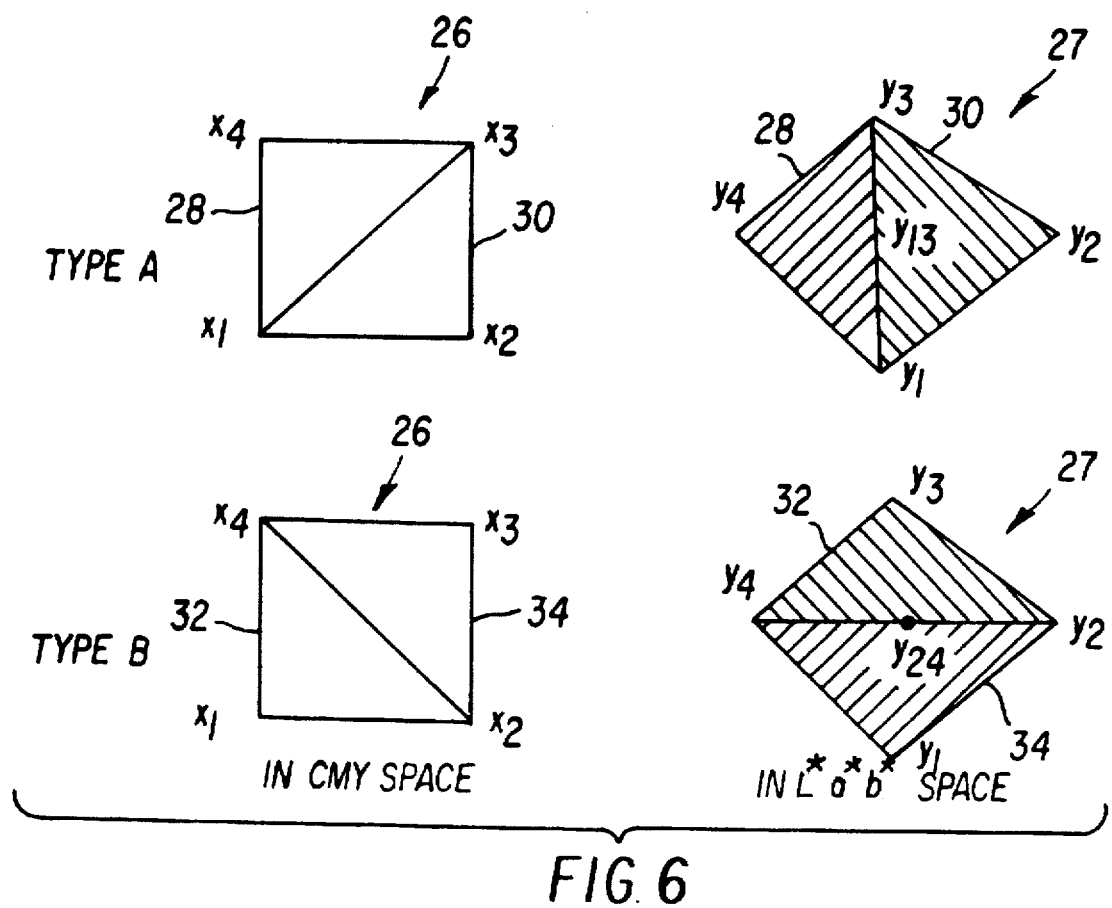
FIG. 6 illustrates alternative methods of dividing a square on the surface of a color cube.
Figure 7:
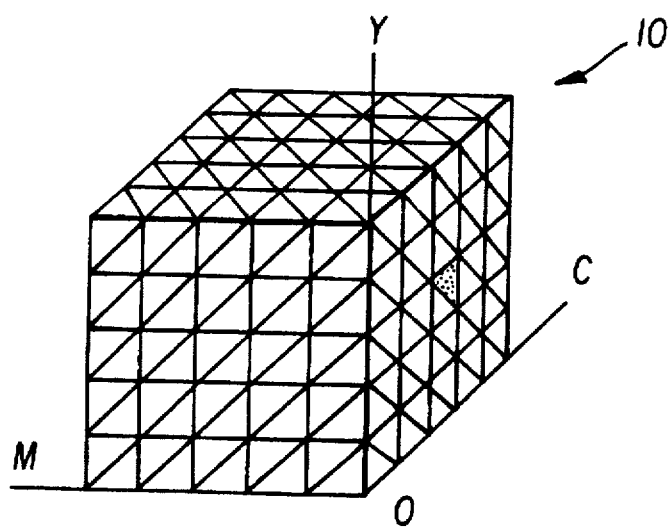
FIGS. 7 and 8 depict corresponding triangles in a color cube 10 and in a gamut 12.

Since the $N^3$ points in the LUT are lattice points in CMY, there are $N^2$ points on each of the 6 faces of the cube 10, which partition each face into $(N-1)^2$ squares (See FIG. 7). In total, there are $6(N-1)^2$ squares. As illustrated in FIG. 6 let $x_1, \ldots, x_4$ be the four corner points of a square 26 in CMY, and $y_1, \ldots, y_4$ be the corresponding 4 points of a polygon 27 in CIEL*a*b*. The square 26 can be partitioned into two triangles 28 and 30 or 32 and 34 in one of two ways as shown in FIG. 6, type A and type B. If the four points $y_1, \ldots, y_4$ are not in a plane (this is usually the case when a curved gamut boundary is being considered), then one partition will lead to a convex shape for the portion of the gamut boundary defined by the four points $y_1, \ldots, y_4$, and the other will lead to a concave shape. The partition corresponding to convex shape can be determined by computing the middle point $y_{13}$ of $y_1$ and $y_3$, and the middle point $y_{24}$ of $y_2$ and $y_4$, and comparing their distances to axis L*. For convenience and speed, the squares may be partitioned into triangles using a regular division arrangement such as illustrated in FIG. 6. The corresponding triangles in CIEL*a*b* space define planes and circumscribe portions of the planes used to define the gamut. The gamut boundary surface can also be defined by a set of small curved surfaces. However, this would increase the complexity in computing gamut boundary points and in determining if a signal is inside the gamut.

Figure 8:
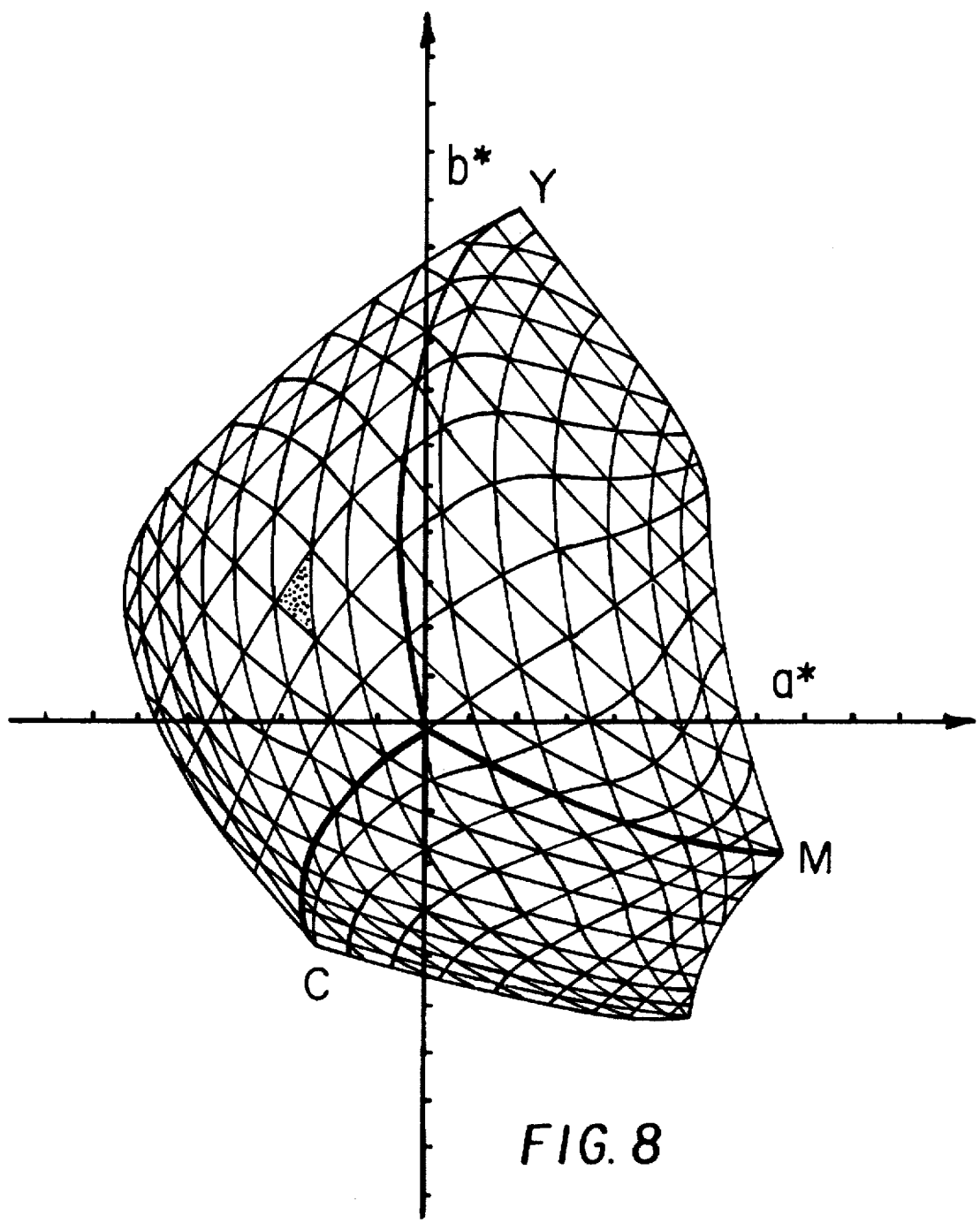

For each of the 6 $(N-1)^2$ squares, the system preferably uses the above regular division arrangement method to split it into 2 triangles. In total, we obtain 12 $(N-1)^2$ triangles in CMY and the same number of triangles in CIEL*a*b*. Putting all the triangles in CMY together gives the surface of the cube 10 as illustrated in FIG. 7, and putting all the triangles in CIEL*a*b* together gives the gamut 12 boundary as illustrated in FIG. 8 where the dark triangle in both Figures corresponds. These triangles may be stored in a triangle table (Table I) as follows.

TABLE I

Gamut Boundary Triangle Table

| Triangle Index | CMY | CIEL*a*b* |
|---|---|---|
| 1 | $x_{11}, x_{12}, x_{13}$ | $y_{11}, y_{12}, y_{13}$ |
| 2 | $x_{21}, x_{22}, x_{23}$ | $y_{21}, y_{22}, y_{23}$ |
| ... | ... | ... |
| $12(N-1)^2$ | ... | ... |

An advantage of defining a gamut boundary in such a way is that there is a 1-1 corresponding relation between points on the surface of the cube 10 in CMY and points on the gamut boundary 12 in CIEL*a*b*. And, as will be seen shortly, determining such a 1-1 corresponding relation can be done easily. Procedure 4 summarizes the above discussion.

Procedure 4:

Construct gamut boundary using triangles based on a LUT.

1) Read in the LUT with $N^3$ entries;

2) Split each of the $6(N-1)^2$ LUT squares into 2 triangles.

3) Store the $12(N-1)^2$ pairs of triangles in a table (Table I).

Figure 9:
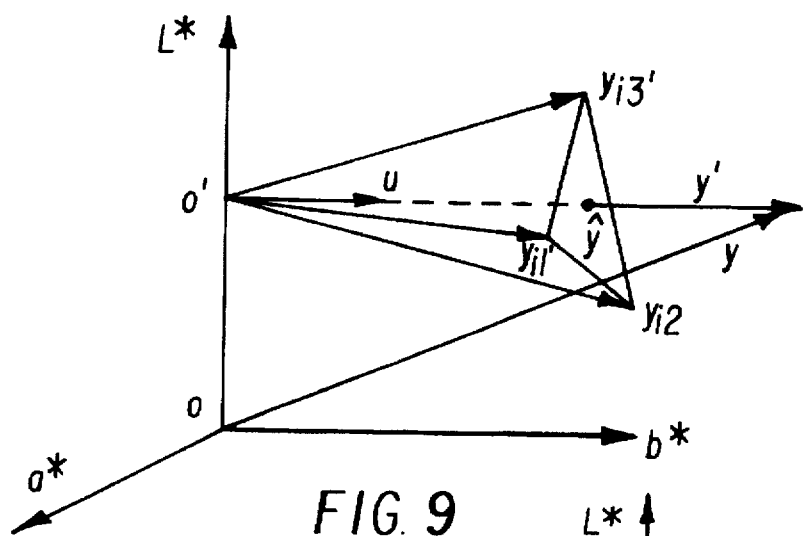
FIG. 9 illustrates a boundary point in a triangle.

Having defined the gamut boundary, a discussion can now be provided as to how to determine whether or not a given point y=(l,a,b) in CIEL*a*b* is in the gamut 12. Referring to FIG. 9, for each triangle $CH(y_{i1}, y_{i2}, y_{i3})$ in Table I, the origin O=(0,0,0) is conventionally translated to O'=(1,0,0) by:

$$y'=y-O', \ y'_{ij}=y_{ij}-O', \ j=1,2,3 \tag{8}$$

Procedure 1 is then used to find a triangle $CH(y'_{i1}, y'_{i2}, y'_{i3})$, whose convex polyhedral cone encloses y', i.e. y' ∈ $CPC(y'_{i1}, y'_{i2}, y'_{i3})$. Next procedure 2 is applied to find and the intersection ŷ of the line O' y', and the plane defined by the three points $y'_{i1}, y'_{i2}, y'_{i3}$. Since $CH(y'_{i1}, y'_{i2}, y'_{i3})=CH(y_{i1}, y_{i2}, y_{i3})$, whether or not the point or signal y is inside the gamut can be determined by comparing the lengths O'ŷ and O'y'. Procedure 5 below describes this.

Procedure 5:

Determine if a given point y=(l, a, b) is in gamut.

1) Apply Procedure 4 to compute Table I;

2) Use Procedure 1 to find a triangle $y_{i1}, y_{i2}, y_{i3}$ from Table I satisfying y' ∈ CPC $(y'_{i1}, y'_{i2}, y'_{i3})$ (Equation (8) describes the relationship between y and y' and other vectors);

3) Use Procedure 2 to determine the intersection ŷ of the line O' y' and the triangle $y'_{i1}, y'_{i2}, y'_{i3}$;

4) If |O'-ŷ|<|O'-y'|, then y is out of gamut, otherwise, it is in gamut.

Now a discussion can be provided as to how to create a gamut descriptor for a given device. As previously discussed a device gamut descriptor is a set of carefully selected gamut boundary points in CIEL*a*b*. There is a certain predetermined pattern to the distribution of these points. For example, they may be located on a set of planes perpendicular to axis L*, the number of points on each plane may be fixed, and the angle between two adjacent points on a plane may be a constant. An example is given below.

Figure 10:
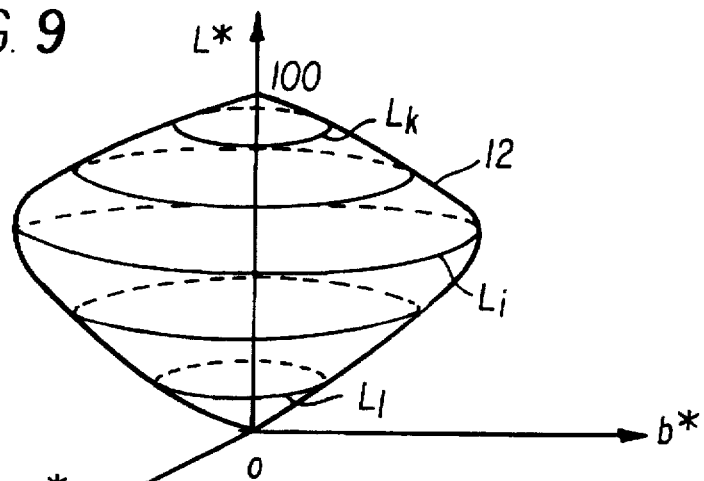
FIG. 10 depicts dividing a gamut into K layers along L*.
Figure 11:
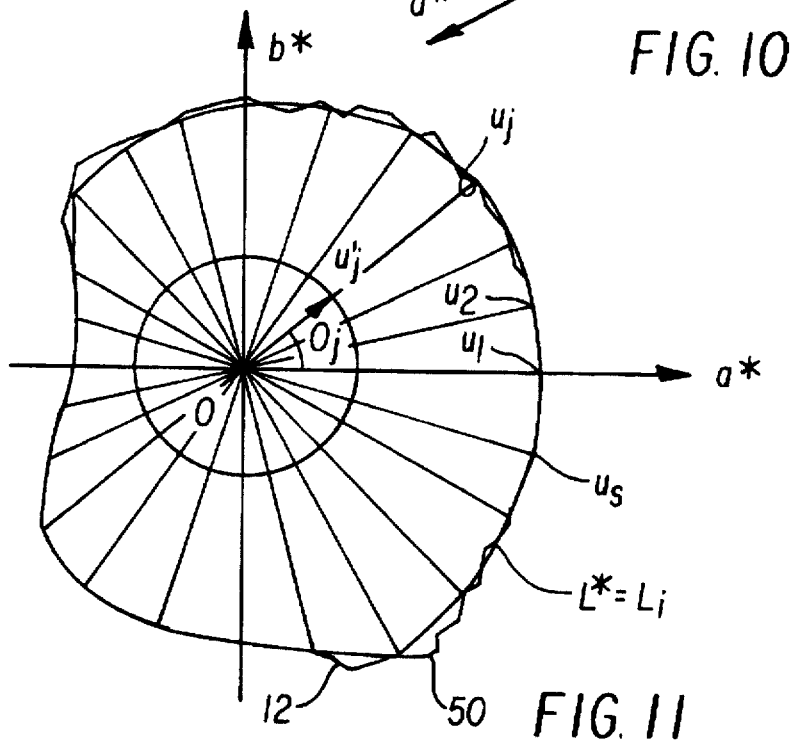
FIG. 11 depicts unit vectors $u_j'$ and the gamut boundary point $u_j$ along the direction $u_j'$ on a layer L.

To construct a gamut descriptor the system first slices the axis L, of the gamut 12 using k planes, $L^*=L_1, L_2, \ldots, L_k$, perpendicular to the axis L* as shown in FIG. 10. The intersection of the gamut 12 and a plane $L^*=L_i$ is a polygon 50 with irregular vertices as shown in FIG. 11. The system then selects equally angled points $u_1, \ldots, u_s$ on the polygon boundary (these points could be off the polygon boundary a little bit for a better result). The angle of $u_j$ is given by $\theta_j=(j-1)\times 360/s$ degree, j=1,2,...,s. The s points approximately describe the gamut boundary at layer $L^*=L_i$. When the system applies this procedure to each layer, a total, of k×s gamut boundary points are obtained. For each of the points or signals, triangle interpolation (Procedure 3) is used to compute the corresponding point or signal on the surface of the cube in CMY. The system then stores all the data into a gamut descriptor table (Table II) as set forth below.

TABLE II

Gamut Descriptor Table

| Layer | CIEL*a*b* | CMY |
|---|---|---|
| $L_1$ | $y_{11}, \ldots, y_{1s}$ | $x_{11}, \ldots, x_{1s}$ |
| $L_2$ | $y_{21}, \ldots, y_{2s}$ | $x_{21}, \ldots, x_{2s}$ |
| ... | ... | ... |
| $L_k$ | $y_{k1}, \ldots, y_{ks}$ | $x_{k1}, \ldots, x_{ks}$ |

The size of the gamut descriptor is determined by the accuracy required. In normal applications, k may be set to be around 20, and s is set to around 180. Procedure 6 summarizes this.

Procedure 6:

Construct a gamut descriptor (Table II) based on a LUT.

1) Apply Procedure 4 to obtain Table I;

2) Read in the number k of layers, and the number s of gamut boundary points on each layer.

3) For each layer $L^*=L_i$, and each unit vector $u'_j$ on the layer (the angle of $u'_j$ is $(j-1)\times 360/s$ degree)

3.1) Use Procedure 5 to find the gamut boundary point $u_j$ along the direction defined by $u'_j$, and Procedure 5 also returns three coefficients $\alpha_1, \alpha_2, \alpha_3$ satisfying $$u_j=\alpha_1 y_{t1}+\alpha_2 y_{t2}+\alpha_3 y_{t3}, \ \alpha_1+\alpha_2+\alpha_3=1, \ \alpha_1, \alpha_2, \alpha_3 \geq 0$$

where $y_{t1}, y_{t2}, y_{t3}$ correspond to the t-th triangle in Table I;

3.2) Interpolate $u_j$ by:

$$v_j=\alpha_1 x_{t1}+\alpha_2 x_{t2}+\alpha_3 x_{t3}$$

where $x_{t1}, x_{t2}, x_{t3}$ are the corresponding points of $y_{t1}, y_{t2}, y_{t3}$;

3.3) Store the pair $u_j$ and $u_j$ in Table II;

4) Output gamut descriptor Table II.

Figure 12:
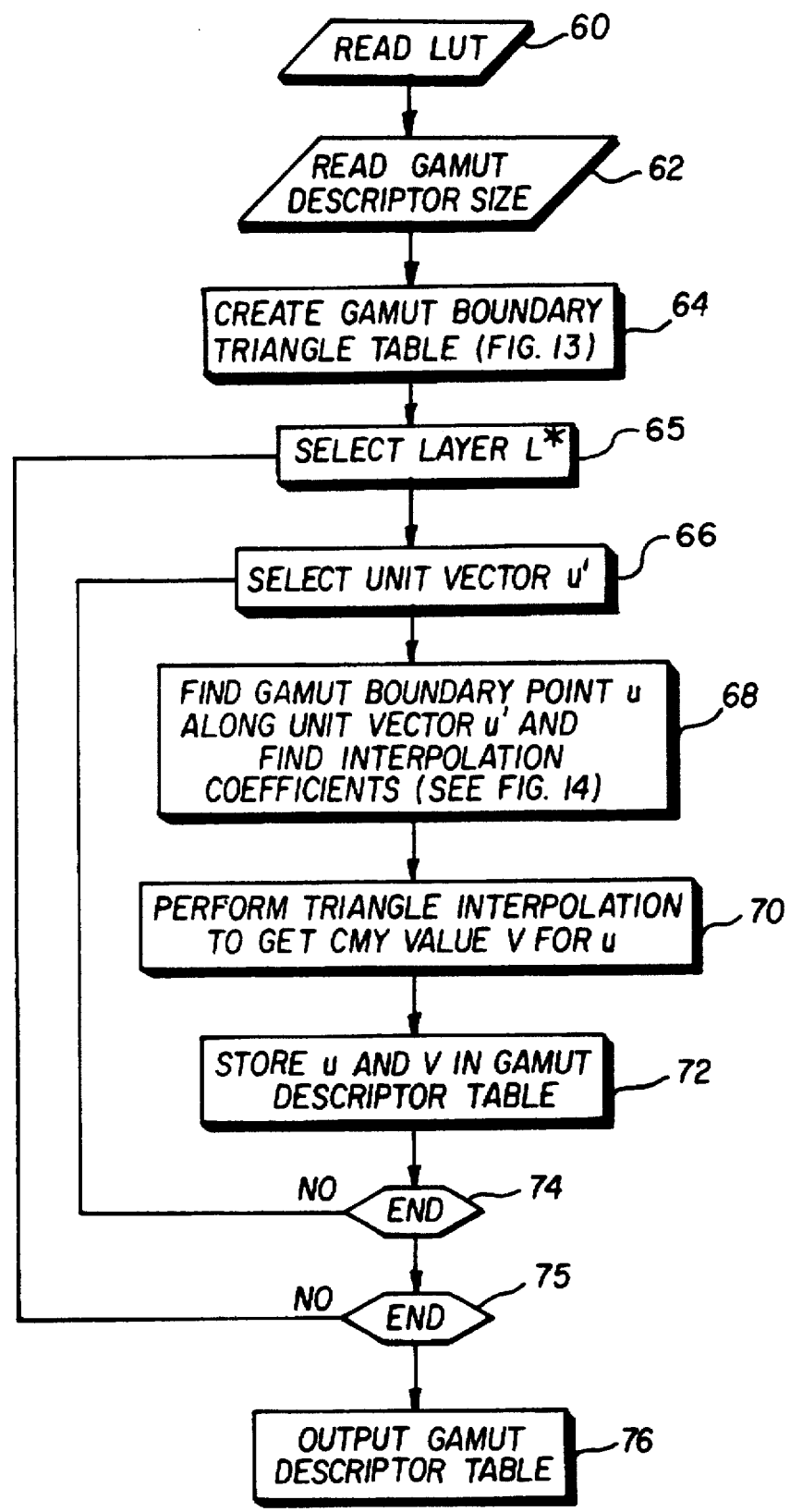
FIGS. 12-15 depict flowcharts of the present invention.

FIGS. 12-15 illustrate the procedures 1-6 previously discussed combined into a single operational flow whereby a gamut descriptor is created. As illustrated in FIG. 12, the first step 60 is to read the look-up table for converting points from the device dependent space, such as CMY, to the device independent space, such as CIEL*a*b*. The next step is to read the size of the gamut descriptor that is desired. The system then creates 64 the gamut boundary triangle table, the flow of which is illustrated in more detail in FIG. 13. Once the triangle table is created a layer is selected 65, a unit vector from among the layers is selected 66 and the gamut boundary point along the unit vector is determined 68 along with the interpolation coefficients. This operation flow will be discussed in more detail with respect to FIG. 14. Next the system performs 70 the triangle interpolation to obtain the corresponding value in CMY for the boundary point. Once the corresponding point is determined the pair of points are stored 72 in the gamut descriptor table. If no other layers and unit vectors need to be processed the system outputs 76 the gamut descriptor table.

Figure 13:
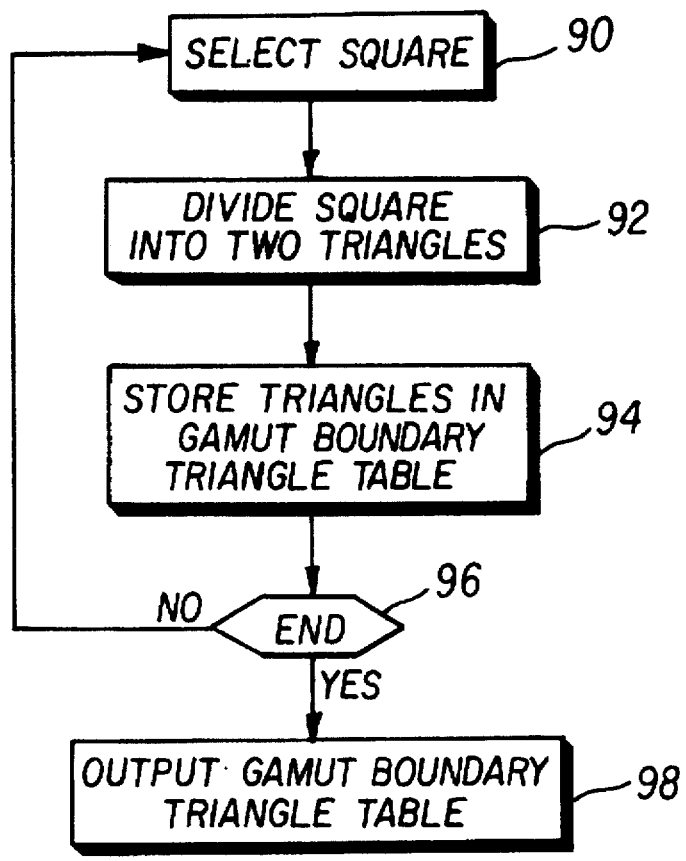

The operation of creating the gamut boundary table starts, as illustrated in FIG. 13, by selecting 90 a square which needs to be divided. This selection can be sequential. This square is divided 92 into two triangles as previously discussed and the triangles are stored in the gamut boundary triangle table. If all of the squares have been processed the gamut boundary triangle table is output 98.

Figure 14:
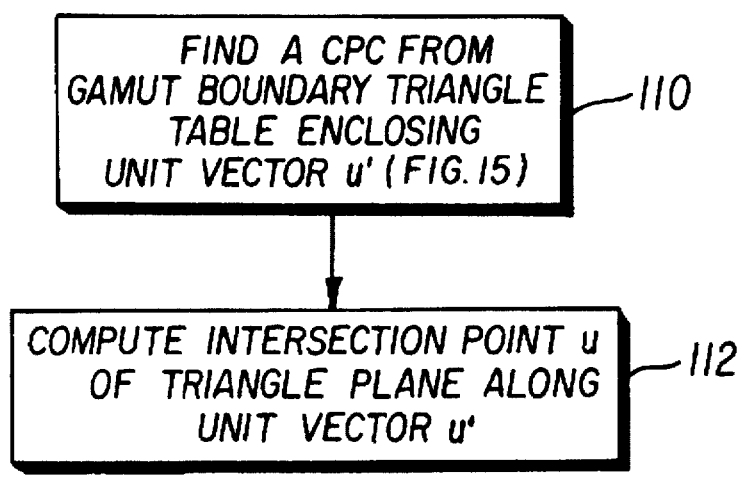

To find the gamut boundary point the system, as illustrated in FIG. 14, first finds 110 the convex polyhedron cone defined by a triangle in the gamut boundary table which encloses the unit vector. The flow of this operation will be discussed in more detail with respect to FIG. 15. Once the triangle is determined the intersection point of the unit vector with the gamut boundary can be easily determined 112.

Figure 15:
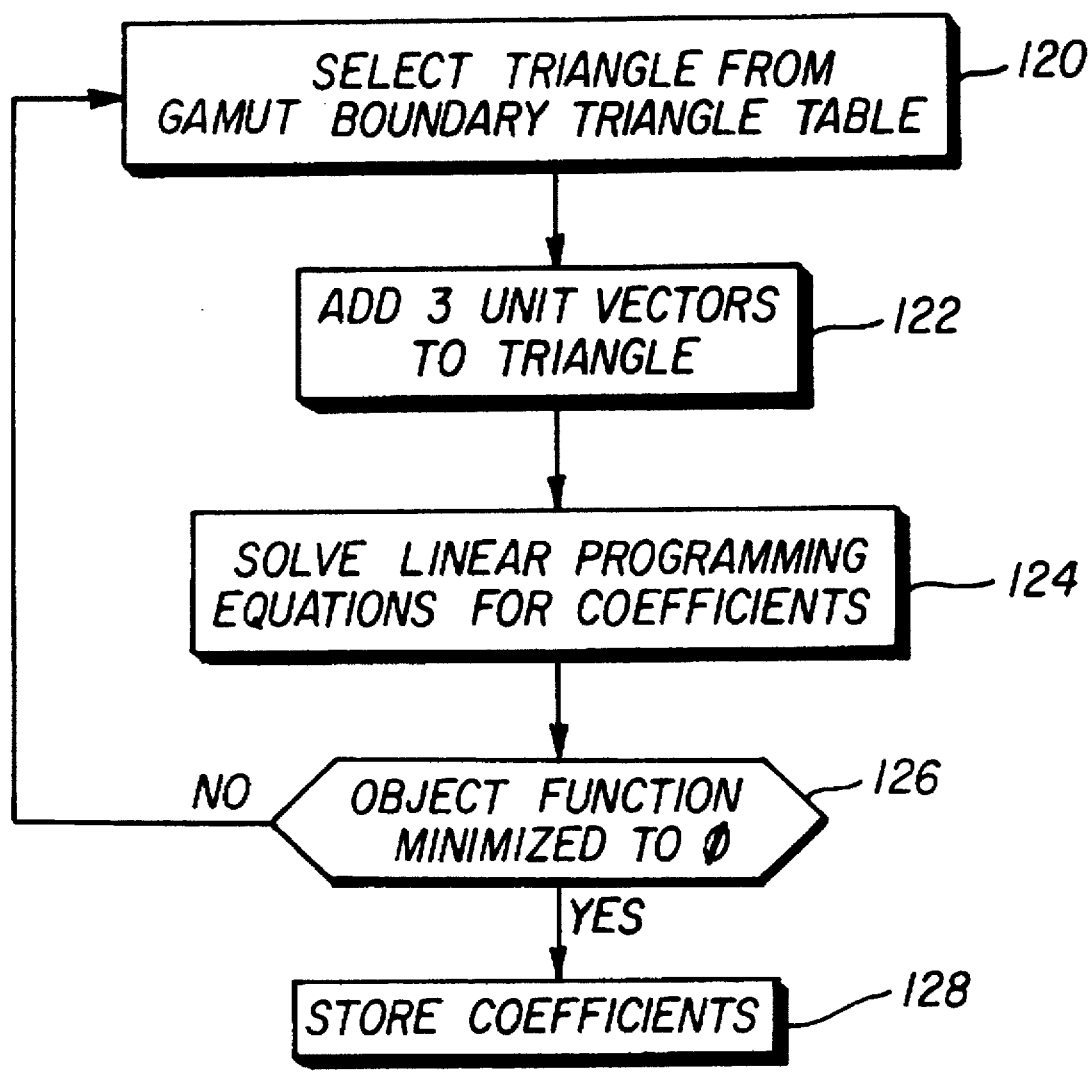

In finding the triangle which encloses the unit vector in accordance with the steps illustrated in FIG. 15, the triangle table I must be searched for candidate triangles which may satisfy the enclosure requirements. To facilitate this search a triangle range table (Table III) as illustrated below is created at the same time the triangle table previously discussed is created. This table III can be combined with the table I if desired.

TABLE III

Triangle Range Table

| Triangle Index | L* Range | | Angle Range | |
|---|---|---|---|---|
| | Min. | Max. | Min. | Max. |
| 1 | $l_{11}$ | $l_{12}$ | $\Theta_{11}$ | $\Theta_{12}$ |
| 2 | $l_{21}$ | $l_{22}$ | $\Theta_{21}$ | $\Theta_{22}$ |
| . | . | . | . | . |
| . | . | . | . | . |
| $12(N-1)^2$ | | | | |

In using this table it should be noted that a unit vector has associated therewith a value along the L* (lightness) axis to which the unit vector has been translated as illustrated in FIG. 9. This L value is used to scan the triangle range table to select for triangles where the L* value of the unit vector fits between the minimum and maximum range (L* Range) of the triangle. A unit vector also has associated therewith an angle θ as illustrated in FIG. 10. This angle is used to scan the triangle candidates found in the first scan to select triangles with the appropriate angle range as final candidates. Once a final candidate triangle has been selected the system adds three unit vectors to the triangle and then solves 124 the conventional linear programming equations for the appropriate coefficients. The solution to the linear programming equations is tested 126 to determine if the object function has been a minimized to 0 and if so the coefficients are stored 128. If not the next final candidate from the triangle table III is examined.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of creating and using a device gamut descriptor, comprising the steps of:
   (a) selecting gamut boundary signals from a gamut in a predetermined regularly spaced pattern in a device independent color space; and
   (b) storing the gamut boundary signals defining the gamut descriptor for use in determining whether a color signal is within the gamut, wherein step (a) comprises the steps of:
      (1) dividing the gamut expressed in a device independent color space into parallel planes separated by a predetermined distance;
      (2) selecting unit vectors in each plane separated by a predetermined angle; and
      (3) determining the intersection point signal of each unit vector and the gamut boundary by;
         (i) defining a convex polyhedral cone using points on the gamut boundary;
         (ii) finding a polyhedral cone enclosing each unit vector;
         (iii) determining the convex coefficients; and
         (iv) determining the intersection point signal using the coefficients
   (c) selecting a test point along the unit vector;
   (d) comparing the test point to the intersection point with a result of the comparison indicating whether the test point is in the gamut; and
   (e) identifying the colors falling outside the gamut descriptor to within the reproducible gamut of the device and processing these colors for display.

2. A method as recited in claim 1, wherein step (ii) comprises the steps of:
   (A) adding at least a unit vector to signals forming the convex polyhedral cone; and
   (B) determining a linear programming solution which minimizes the sum of the convex coefficients to zero.

3. A method as recited in claim 1, wherein the intersection point signal is determined by interpolating the unit vector with the convex coefficients.

4. A method as recited in claim 1, wherein the device is a three color device and wherein step (i) comprises the steps of:
   (A) dividing each surface of a color cube comprising the gamut in device dependent color space into squares;
   (B) dividing each square into a pair of triangles;
   (C) designating the gamut boundary surface as a set of corresponding triangles in device independent color space; and
   (D) defining a set of convex polyhedral cones using the corners of the triangles in the device independent color space.

5. A method as recited in claim 1 further comprising the steps of:
   (4) selecting a test signal along the unit vector; and
   (5) comparing the test signal to the intersection point signal with a result of the comparison indicating whether the test signal is in the gamut.

6. A method as recited in claim 4, wherein step (iv) comprises performing a triangle interpolation using a triangle on the surface of the color gamut corresponding to the convex polyhedral cone that encloses a unit vector found in step (ii) and the convex coefficients.

7. An apparatus for creating and using a device gamut boundary descriptor, comprising:

input means for reading a look-up table for translating a signal in a device dependent color space into a device independent color space;

table means for creating a gamut boundary table including boundary triangles;

selection means for selecting boundary triangles enclosing each of signals of a predetermined regularly spaced pattern of device independent space color signals, the selection means including means for slicing the gamut expressed in device independent space using parallel planes separated by a predetermined distance;

means for selecting unit vectors in each plane separated by a predetermined angle; and means for determining the intersection point signal of each unit vector and the gamut boundary and generating a signal representing the intersection point by:
 (i) defining a convex polyhedral cone using points on the gamut boundary;
 (ii) finding a polyhedral cone enclosing each unit vector;
 (iii) determining the convex cone coefficients; and
 (iv) determining the intersection point signal using the coefficients;

interpolation means for performing a triangle interpolation for each device independent color signal creating a gamut boundary descriptor list;

storage means for storing the gamut boundary descriptor list for determining whether a color signal is within a gamut;

means for selecting a test point along the unit vector;

means for comparing the test point to the intersection point with a result of the comparison indicating whether the test point is in the gamut; and means for identifying the colors falling outside the gamut descriptor to within the reproducible gamut of the device and processing these colors for display.

* * * * *